United States Patent
Sawada

(10) Patent No.: US 8,085,138 B2
(45) Date of Patent: Dec. 27, 2011

(54) DISPLAY-IMAGE SWITCHING APPARATUS AND METHOD

(75) Inventor: Kazuhisa Sawada, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 416 days.

(21) Appl. No.: 12/370,097

(22) Filed: Feb. 12, 2009

(65) Prior Publication Data

US 2009/0284364 A1 Nov. 19, 2009

(30) Foreign Application Priority Data

May 19, 2008 (JP) .................. 2008-131023

(51) Int. Cl.
*B60Q 1/00* (2006.01)
(52) U.S. Cl. .................. 340/435; 340/441; 701/70
(58) Field of Classification Search .................. 340/441, 340/435, 461, 462; 348/143, 148; 382/104; 701/70, 71, 74
See application file for complete search history.

(56) References Cited

U.S. PATENT DOCUMENTS

| 6,474,750 B2 * | 11/2002 | Tanaka et al. ............. 303/113.4 |
| 6,685,282 B2 | 2/2004 | Sakamoto |

FOREIGN PATENT DOCUMENTS

| DE | 33 42 553 A1 | 6/1985 |
| DE | 101 41 616 B4 | 7/2006 |
| JP | 5-238313 | 9/1993 |
| JP | 5-278625 | 10/1993 |

* cited by examiner

*Primary Examiner* — Thomas Mullen
(74) *Attorney, Agent, or Firm* — Oblon, Spivak, McClelland, Maier & Neustadt, L.L.P.

(57) ABSTRACT

A display-image switching apparatus that switches the image shown in a display includes: an antilock brake system operation determination portion that determines whether an antilock brake system of the vehicle is operating; a provisional vehicle speed calculation portion that calculates a provisional vehicle speed that represents a speed at which the vehicle would travel if the antilock brake system were not operating; and a display-image switching portion that switches the displayed image based on the provisional vehicle speed if the antilock brake system is operating.

11 Claims, 4 Drawing Sheets

RELATED ART

DISPLAY-IMAGE SWITCHING APPARATUS AND METHOD

INCORPORATION BY REFERENCE

The disclosure of Japanese Patent Application No. 2008-131023 filed on May 19, 2008 including the specification, drawings and abstract is incorporated herein by reference in its entirety.

BACKGROUND OF THE INVENTION

1. Field of the Invention

The invention relates to a display-image switching apparatus for a vehicle, and in particular the invention relates to a display-image switching apparatus that switches a display image between an image captured by a camera provided in a vehicle to monitor the surroundings of the vehicle and another image, in accordance with the speed of the vehicle.

2. Description of the Related Art

Japanese Patent Application Publication No. 5-238313 (JP-A-5-238313) describes an in-dash information display apparatus that selectively shows an image output from a TV tuner or a navigation system and an image output from a vehicle camera in a display (e.g., CRT) provided in the passenger compartment of the vehicle. According to this apparatus, for the purpose of improving user-friendliness, the image shown in the display is switched in accordance with the speed of the vehicle. More specifically, the image of the navigation system or the TV tuner is shown in the display when the vehicle speed exceeds a threshold speed (e.g., when the vehicle is running at a normal speed), and the display image is automatically switched to the image of the vehicle camera when the vehicle speed falls to or below the threshold speed (e.g., when the driver should pay much attention to the circumference, such as during low-speed driving of the vehicle).

However, the above-described display-image switching apparatus involves the following problems. First, the accuracy in determining the vehicle speed is limited. Typically, the vehicle speed is estimated from the rotational speed of the wheels of the vehicle. However, the wheel speeds fluctuate significantly if an ABS (Anti-Lock Brake System) is operating, for example. That is, for example, upon panic braking, the ABS controls the slip rates of the respective wheels within desired ranges so as to avoid locking of the wheels. Under such circumstances, the wheels are locked and released alternately in very short cycles, thereby causing large fluctuations in the wheel speeds.

The graph in FIG. 6 illustrates how the vehicle speed determined from the wheel speeds (will be referred to as "wheel-speed-based vehicle speed") changes during operation of ABS. The horizontal axis of FIG. 6 represents time, and the vertical axis represents the wheel-speed-based vehicle speed. Referring to FIG. 6, although the wheel-speed-based vehicle speed 901 generally decreases in time, it goes through several sharp increases and decreases. That is, the wheel-speed-based vehicle speed fluctuates significantly during operation of ABS. Therefore, if the display image is switched based on the wheel-speed-based vehicle speed as described in JP-A-5-238313 while the vehicle speed is fluctuating during operation of ABS, the display image is switched unnecessarily, and frequently, and this is not desirable. The graph of FIG. 7 illustrates an example where display-image switching control is executed based on a change in the wheel-speed-based vehicle speed. Referring to FIG. 7, the navigation image is shown in the display when the wheel-speed-based vehicle speed 901 exceeds a threshold speed 903, and the vehicle camera image is shown in the display when the wheel-speed-based vehicle speed is below the threshold speed 903. In this example, the display image is repeatedly switched between the navigation image and the vehicle camera image in short cycles. Thus, during operation of ABS, due to such repeated display-image switching between the navigation image and the vehicle camera image, the display image becomes hard to recognize (it appears like a flickering image). That is, undesired display image switching occurs frequently.

SUMMARY OF THE INVENTION

The invention provides a display-image switching apparatus and a display-image switching method that switch a display image in accordance with the vehicle speed while avoiding undesired switching of the display image during operation of ABS.

The following are example structures and methods of the invention. It is to be noted that the reference numerals in parentheses and the supplementary explanations are provided only to identify the corresponding elements and methods incorporated in the example embodiment presented in this specification, and the invention is not limited at all by the example embodiment.

The first aspect of the invention relates to a display-image switching apparatus that executes a display-image switching control to switch an image shown in a display between an image captured by a camera provided in a vehicle to monitor the surroundings of the vehicle and another image, based on a speed of the vehicle. The display-image switching apparatus has: an antilock brake system operation determination portion that determines whether an antilock brake system of the vehicle is operating; a provisional vehicle speed calculation portion that calculates a provisional vehicle speed, wherein the provisional vehicle speed represents a speed at which the vehicle would travel if the antilock brake system were not operating; and a display-image switching portion that executes the display-image switching control based on the provisional vehicle speed when the antilock brake system is operating.

According to the display-image switching apparatus, undesired switching of the display image is prevented during operation of antilock brake system.

The second aspect of the invention relates to a display-image switching method for switching an image shown in a display between an image captured by a camera provided in a vehicle to monitor the surroundings of the vehicle and another image, based on a speed of the vehicle. The method includes: determining whether an antilock brake system of the vehicle is operating; calculating a provisional vehicle speed, wherein the provisional vehicle speed represents a speed at which the vehicle would travel if the antilock brake system were not operating; and switching the image shown in the display based on the provisional vehicle speed if the antilock brake system is operating.

The display-image switching method provides the same effects as those obtained with the display-image switching apparatus of the first aspect of the invention.

According to the display-image switching apparatus and method of the invention, frequent switching of the display image can be prevented during operation of antilock brake system.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Hereinafter, an example embodiment of the invention will be described with reference to the drawings. Note that the invention is not limited to any of these example embodiments.

Figure 1:
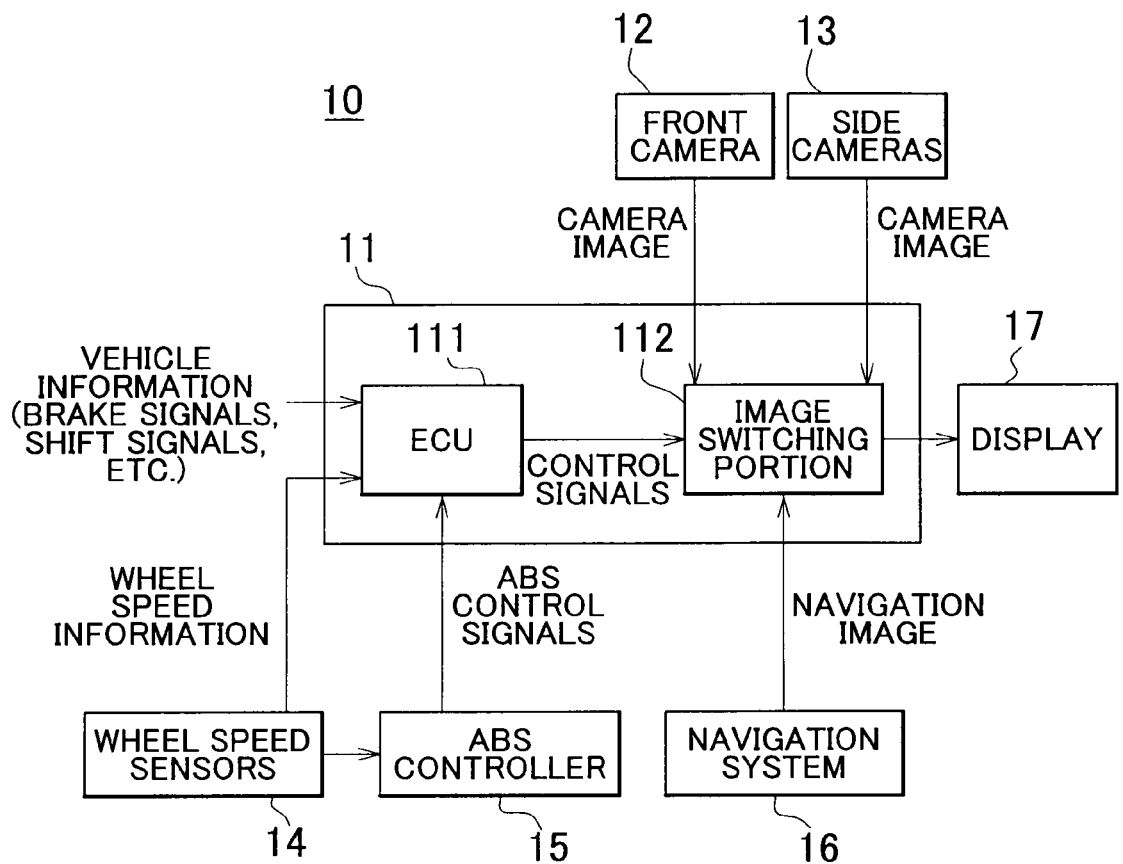
FIG. 1 is a block diagram illustrating the configuration of a vehicle incorporating an in-dash image display apparatus according to an example embodiment of the invention.

The block diagram of FIG. 1 illustrates the configuration of a vehicle 10 that incorporates an in-dash image display apparatus 11 according to an example embodiment of the invention. Referring to FIG. 1, the vehicle 10 incorporates the in-dash image display apparatus 11, a front camera 12, side cameras 13, wheel-speed sensors 14, an ABS controller 15, a navigation system 16, and a display 17.

The front camera 12 and the side cameras 13 (e.g., CCD cameras) are used to monitor the surroundings of the vehicle. The front camera 12 is disposed at the front of the vehicle body and oriented so as to capture an image of the view in front of the vehicle. The side cameras 13 are disposed at the left and right side of the vehicle, respectively, so as to capture images of the views on both sides of the vehicle. The images captured by the front camera 12 and the side cameras 13 are output to an image switching portion 112.

The in-dash image display apparatus 11 is constituted of an ECU (Electronic Control Unit) 111 and the image switching portion 112. The ECU 111 is constituted of a ROM (Read Only Memory), a RAM (Random Access Memory), a CPU (Central Processing Unit), and so on, and executes various controls in this example embodiment. For example, the ECU 111 obtains various vehicle information and various information from the wheel speed sensors, an ABS controller, and so on, and executes the controls described below, and outputs display-image-switching control signals to the image switching portion 112 to switch the image shown in the display 17 (will be simply referred to as "display image" where necessary). Note that the information on the state of the vehicle includes, for example, information on the operation state of the brakes.

The image switching portion 112 receives the image output from the navigation system 16 (will be simply referred to as "navigation image" where necessary) and the images output from the front camera 12 and the side cameras 13 (will be simply, and collectively, referred to as "camera image" where necessary), and the image switching portion 112 sets the display image to the navigation image or to the camera image in accordance with the display-image-switching control signals from the ECU 111.

The wheel-speed sensors 14 detect the rotational speed of each wheel of the vehicle and outputs the detected wheel speeds to at least the ECU 111 and the ABS controller 15.

The ABS controller 15 outputs control signals for brake units (not shown in the drawings) based on the wheel speeds detected by the wheel-speed sensors 14. More specifically, for example, if it is detected that any wheel of the vehicle is slipping as a result of brake pedal operation by the driver, the ABS controller 15 controls the slip of the wheel to a desired slip by controlling the brake-fluid pressure in the wheel cylinder by opening or closing a pressure-control valve provided in the corresponding brake unit. It is to be noted that the brake unit may produce braking force by controlling the position of the brake pad using an electric motor instead of a hydraulic brake unit. Meanwhile, when the ABS is operating, the ABS controller 15 outputs a signal indicating that the ABS is operating to the ECU 111.

The navigation system 16 is an in-dash navigation system that generates map images and route guidance images, which will be referred to as "navigation images", and output outputs them to the image switching portion 112.

Next, the outline of a display-image switching control routine of this example embodiment will be described. In this example embodiment, the display image is switched between the navigation image and the camera image based on the conditions described below. That is, the camera image is shown in the display 17 if a wheel-speed-based vehicle speed that is determined on the basis of the wheel speeds is below a threshold speed, and the navigation image is shown in the display 17 if the vehicle speed is equal to or above the threshold speed. To perform such switching of the display image, in this example embodiment, the following control routine is executed. In this routine, first, if the brake pedal is depressed while the vehicle is traveling at a speed equal to or above a predetermined speed (i.e., while the navigation image is shown in the display 17), it is determined whether the ABS is now operating. If it is not, the above-described determination for the display-image switching is performed based on an actual speed of the wheel (will be referred to as "actual wheel speed"). On the other hand, if the ABS is working, a "provisional vehicle speed" is determined, and the above-described determination for the display-image switching is performed based on the provisional vehicle speed.

Figure 2:
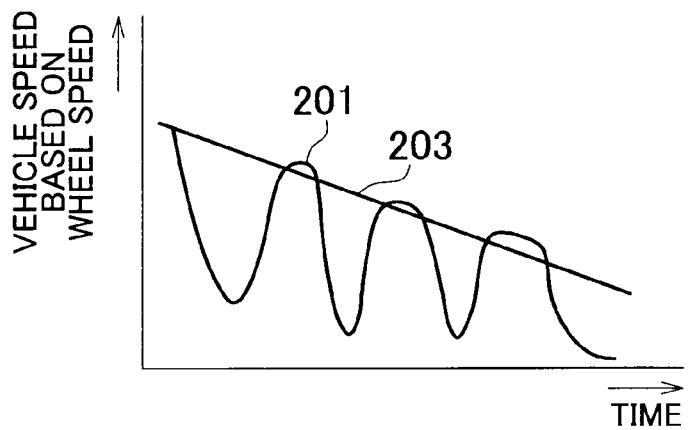
FIG. 2 is a graph indicating the provisional vehicle speed.

Hereinafter, details of the provisional vehicle speed will be described. The provisional vehicle speed is a vehicle speed that is estimated, with regard to a change in the vehicle speed caused by the depression of the brake pedal, on the assumption that the state of the road surface does not cause activation of the ABS. That is, the provisional vehicle speed represents a speed at which the vehicle would travel if the vehicle brakes were applied on a road surface the state of which will not cause an activation of the ABS. The graph of FIG. 2 indicates the provisional vehicle speed. FIG. 2 illustrates a state where the ABS is operating. In the graph, 201 represents the actual wheel speed. The actual wheel speed 201 is controlled by the ABS and thus it fluctuates significantly. On the other hand, 203 represents the provisional vehicle speed. Because the provisional vehicle speed is the vehicle speed estimated on the assumption that the state of the road surface is not enough to cause activation of the ABS, it gradually decreases in time.

Figure 3:
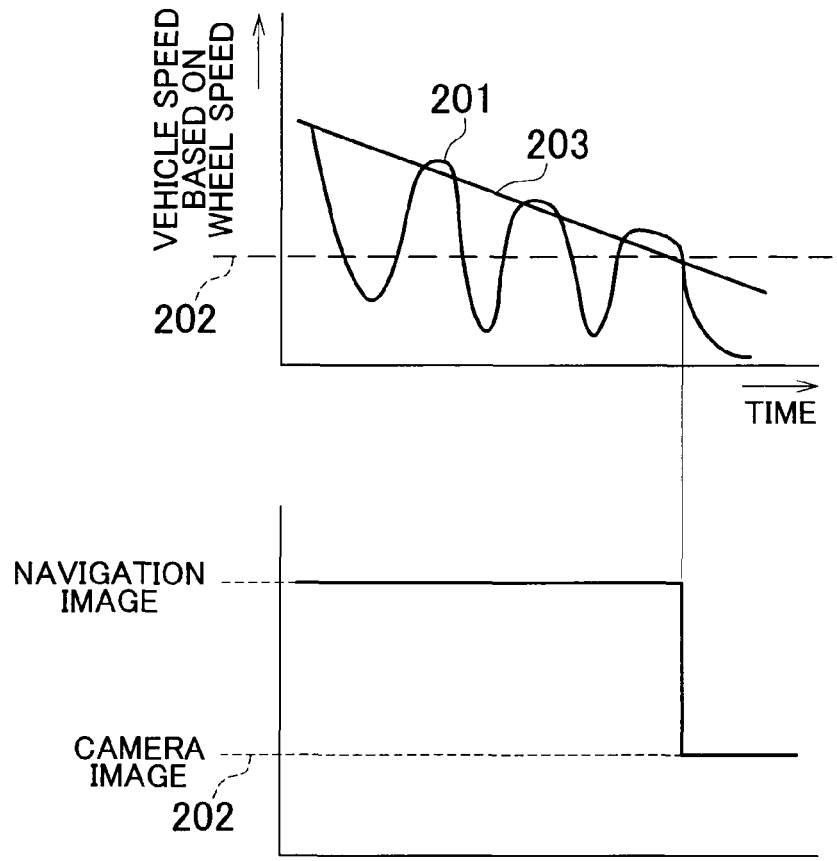
FIG. 3 is a chart illustrating how the display image is switched based on the provisional vehicle speed.

In this example embodiment, if the ABS is operating, the display-image switching determination is performed based on the provisional vehicle speed 203. FIG. 3 illustrates how the display image is switched based on the provisional vehicle speed. In FIG. 3, 202 represents the threshold speed for switching the display image (will be referred to as "display-switch threshold speed"). Referring to FIG. 3, the display image is switched from the navigation image to the camera image for the first time when the provisional vehicle speed falls below the display-switch threshold speed 202. In this manner, it is possible to prevent undesired switching of the display image that may otherwise occur (at the valleys of the curve of the actual wheel speed 201 in the graph) due to the large fluctuations in the wheel speeds until the provisional vehicle speed 203 falls below the display-switch threshold speed 202.

Figure 4:
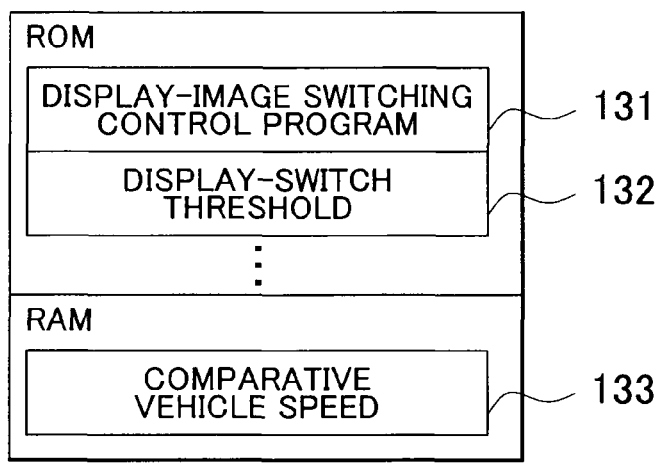
FIG. 4 is a memory map indicating the data stored in the ECU.
Figure 5:
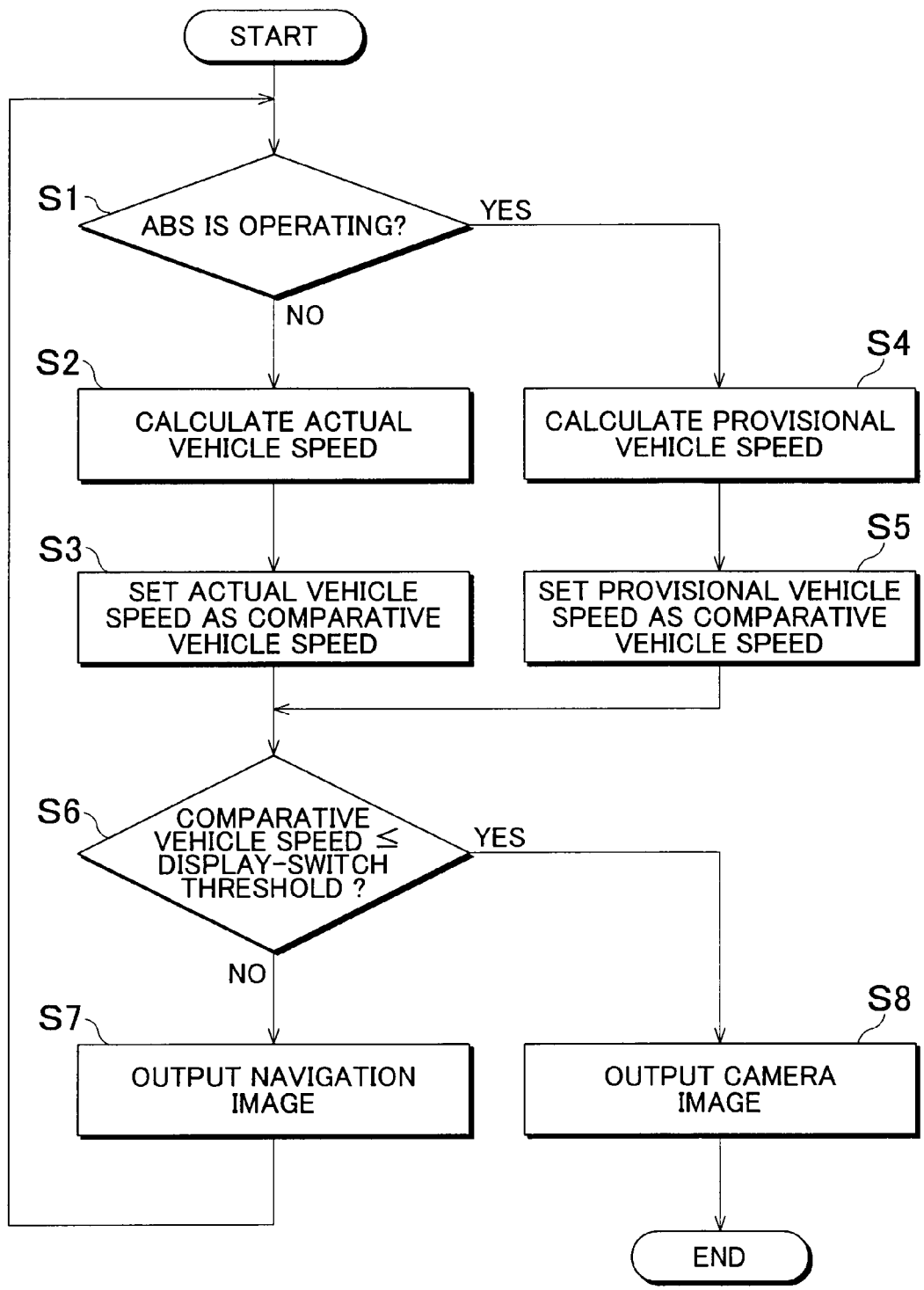
FIG. 5 is a flowchart illustrating the detailed procedure of the display-image switching routine.
Figure 6:
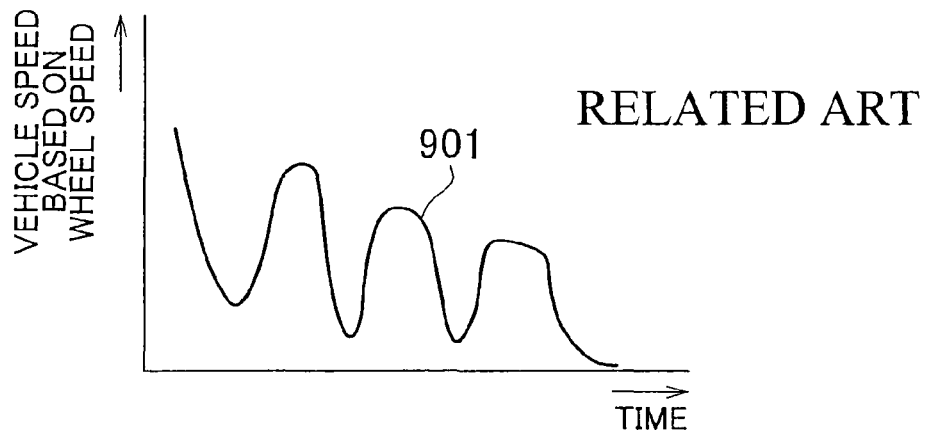
FIG. 6 is a graph illustrating how the vehicle speed determined from the wheel speeds changes during operation of ABS.
Figure 7:
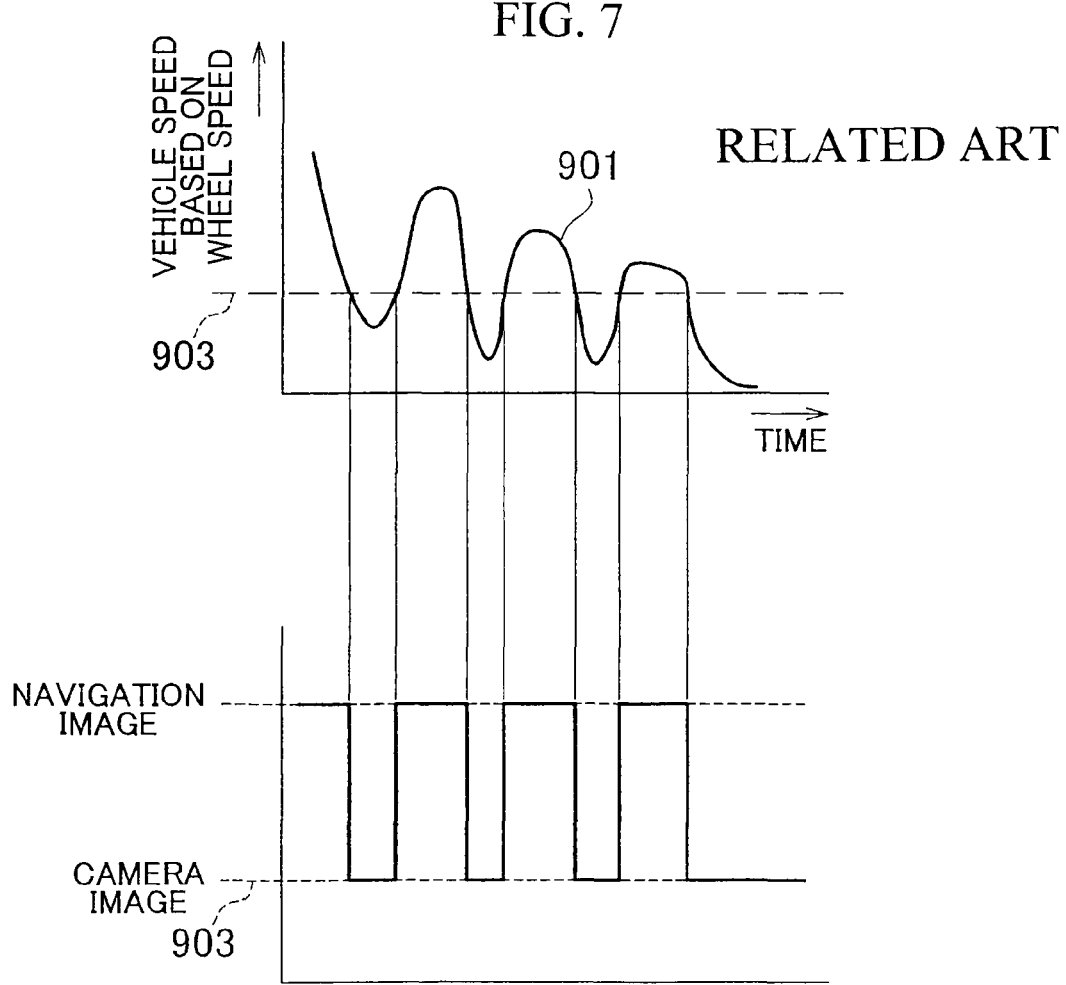
FIG. 7 is a graph illustrating an example case where display-image switching control is executed based on a change in the vehicle speed determined from the wheel speeds.

Hereinafter, various data and programs that are used in this example embodiment will be described in detail with reference to FIG. 4 to FIG. 5. FIG. 4 is a memory map indicating the data stored in the ECU 111. Referring to FIG. 4, the ROM of the ECU 111 stores a display-image switching control program 131 for accomplishing the following control and a display-switch threshold speed 132. The display-switch threshold speed 132 is the vehicle speed at which the display image is switched between the camera image and the navigation image. The display-switch threshold speed 132 is a predetermined value.

The RAM of the ECU 111 stores a comparative vehicle speed 133 that is a variant used in the display-image switching control program 131. The switching of the display image is performed through comparison between the comparative vehicle speed 133 and the display-switch threshold speed 132. Further, the RAM stores various flags used in the display-image switching control program 131.

Hereinafter, each process of the display-image switching control routine executed by the ECU 111 will be described in detail. The flowchart of FIG. 5 illustrates the detailed procedure of the display-image switching routine. The display-image switching routine starts in response to the brake pedal being depressed when the vehicle speed is equal to or above the display-switch threshold speed 132 and the navigation image is therefore shown in the display 17.

When it is detected that the brake pedal has been depressed, first, the ECU 111 determines, based on the ABS operation signals output from the ABS controller 15, whether the ABS is now operating (step S1). If the ABS is not operating (step S1: NO), the ECU 111 obtains the detected wheel speed from the wheel-speed sensors 14, and then calculates the actual vehicle speed based on the detected wheel speeds (step S2). Note that this calculation of the actual vehicle speed may be performed using conventional methods and therefore its details will not be described.

Then, the ECU 111 sets the calculated actual vehicle speed as a comparative vehicle speed 133 (step S3) and then proceeds to step S6.

Alternatively, if it is determined in step S1 that the ABS is now operating (step S1: YES), the ECU 111 calculates the provisional vehicle speed as described above (step S4). Any appropriate method may be used to calculate the provisional vehicle speed. For example, the provisional vehicle speed may be calculated based on the coefficient of friction ($\mu$) between the wheels and the road surface when the ABS is operating. In this case, for example, the decrease gradient of the provisional vehicle speed changes in accordance with the manner in which the wheel speed decreases. For example, if the rate of decrease in the wheel speed is high, it is determined that the friction coefficient is low, and the provisional vehicle speed is calculated in the assumption that its decrease gradient is small. However, if the rate of decrease in the wheel speed is low, it is determined that the friction coefficient is high, and the decrease gradient of the provisional vehicle speed is calculated based on the actual wheel speed. Further, the provisional vehicle speed may be calculated using the output of a G-sensor (acceleration sensor). In this case, for example, the provisional vehicle speed is calculated based on the deviation of the output value of the G-sensor from the actual decrease in the wheel speed.

Next, the ECU 111 sets the calculated provisional vehicle speed as the comparative vehicle speed 133 (step S5).

Then, the ECU 111 determines whether the comparative vehicle speed 133 is equal to or below the display-switch threshold speed 132 (step S6). At this time, if it is determined that the comparative vehicle speed 133 exceeds the display-switch threshold speed 132 (step S6: NO), the ECU 111 executes a process to show the navigation image in the display 17 (step S7). That is, the ECU 111 determines whether the image switching portion 112 is presently outputting the navigation image to the display 17, and if not, the ECU 111 outputs a control signal for the image switching portion 112 to output the navigation image to the display 17. In response to the control signal from the ECU 111, the image switching portion 112 switches the output for the display 17 from the camera image to the navigation image. After this, the ECU 111 returns to step S1 and repeats the foregoing processes.

Referring back to step S6, if it is determined in this step that the comparative vehicle speed 133 is equal to or below the display-switch threshold speed 132 (step S6: YES), the ECU 111 executes a process to show the camera image in the display 17 (step S8). That is, the ECU 111 determines whether the image switching portion 112 is presently outputting the camera image to the display 17, and if not, the ECU 111 outputs control signals for the image switching portion 112 to output the camera image to the display 17. In response to the control signal form the ECU 111, the image switching portion 112 switches the output for the display 17 from the navigation image to the camera image. After this, the ECU 111 finishes the display-image switching routine.

According to the example embodiment, the display image is switched based on the provisional vehicle speed when the ABS is operating, and the display image is switched based on the actual wheel speed when the ABS is not operating. As a result, undesired switching of the display image during operation of the ABS may be prevented, and the display image may be switched in a more user-friendly manner.

Although the display image is switched between the navigation image and the camera image in the example embodiment, the invention is not restricted to this. For example, the display image may be switched between an image of a TV tuner or a DVD system and the camera image.

Further, while changes in the wheel speed caused by the ABS are referenced in the example embodiment, the invention is not restricted to this. For example, the invention may be applied to a traction control system. In this case, the determination as to whether the ABS is operating in step S1 shown in FIG. 5 may be replaced with a determination as to whether the traction control system is operating. In this case, for example, when the vehicle starts moving from a stop (the camera image is shown in the display 17 at this time), the provisional vehicle speed is calculated if the detected wheel speed is high due to slipping of the wheels of the vehicle, and then the display image is switched based on the calculated provisional vehicle speed, whereby the camera image continues to be shown in the display 17, rather than being switched to the navigation image.

Thus, the display-image switching apparatuses and the display-image switching control programs according to the invention prevent undesired display-image switching during ABS operation, and therefore they may be effectively applied to devices for switching the image shown in an in-dash display, and the like.

What is claimed is:

1. A display-image switching apparatus comprising:
an antilock brake system operation determination portion that determines whether an antilock brake system of a vehicle is operating;
a provisional vehicle speed calculation portion that calculates a provisional vehicle speed, wherein the provisional vehicle speed represents a speed at which the vehicle would travel while a brake pedal of the vehicle is depressed and if the antilock brake system were not operating; and
a display-image switching portion that executes display-image switching control to switch an image shown in a display between an image captured by a camera provided in the vehicle to monitor the surroundings of the vehicle and another image, based on a comparative speed of the vehicle, wherein when the antilock brake system operation determination portion determines that the antilock brake system of the vehicle is not operating, the actual speed of a wheel of the vehicle is set as the comparative speed, and when the antilock brake system operation determination portion determines that the antilock brake system of the vehicle is operating, the provisional vehicle speed is set as the comparative speed.

2. The display-image switching apparatus according to claim 1, wherein:
when the antilock brake system is operating, the display-image switching portion shows the image captured by the camera in the display when the provisional vehicle speed is equal to or below a threshold speed; and
when the antilock brake system is not operating, the display-image switching portion shows the image captured by the camera in the display if an actual vehicle speed that corresponds to the actual running speed of the vehicle is equal to or below the predetermined value.

3. The display-image switching apparatus according to claim 2, further comprising:
a wheel speed sensor that detects the rotational speed of at least one wheel of the vehicle, wherein
the display-image switching portion calculates the actual vehicle speed based on the wheel speed detected by the wheel speed sensor.

4. The display-image switching apparatus according to claim 1, wherein when the antilock brake system is operating, the provisional vehicle speed calculation portion calculates a coefficient of friction between wheels of the vehicle and a road surface and calculates the provisional vehicle speed based on the calculated friction coefficient.

5. The display-image switching apparatus according to claim 1, wherein the provisional vehicle speed calculation portion calculates the provisional vehicle speed when the antilock brake system is operating.

6. The display-image switching apparatus according to claim 1, further comprising:
an acceleration sensor that detects an acceleration of the vehicle, wherein
the provisional vehicle speed calculation portion calculates the provisional vehicle speed based on the acceleration detected by the acceleration sensor.

7. A display-image switching method comprising:
determining whether an antilock brake system of a vehicle is operating;
calculating a provisional vehicle speed, wherein the provisional vehicle speed represents a speed at which the vehicle would travel while a brake pedal of the vehicle is depressed and if the antilock brake system were not operating; and
switching an image shown in a display between an image captured by a camera provided in the vehicle to monitor the surroundings of the vehicle and another image, based on a comparative speed of the vehicle, wherein when the antilock brake system is determined to not be operating, the actual speed of a wheel of the vehicle is set as the comparative speed, and when the antilock brake system of the vehicle is determined to be operating, the provisional vehicle speed is set as the comparative speed.

8. The display-image switching method according to claim 7, wherein the provisional vehicle speed is calculated when the antilock brake system is operating.

9. A display-image switching apparatus comprising
a slip determining portion that determines whether any wheel of a vehicle is slipping as a result of brake operation or accelerator pedal operation;
a provisional vehicle speed calculating portion that calculates a provisional vehicle speed, wherein the provisional vehicle speed represents a speed at which the vehicle would travel if none of the wheels of the vehicle were slipping; and
a display-image switching portion that executes display-image switching control to switch an image shown in a display between an image captured by a camera provided in the vehicle to monitor the surroundings of the vehicle and another image, based on a comparative speed of the vehicle, wherein when the slip determining portion determines that none of the wheels of the vehicle are slipping, the actual speed of a wheel of the vehicle is set as the comparative speed, and when the slip determining portion determines that any wheel of the vehicle is slipping, the provisional vehicle speed is set as the comparative speed.

10. The display-image switching apparatus according to claim 9, wherein:
the slip determining portion operates an antilock brake system of the vehicle when the slip determining portion determines that any wheel of the vehicle is slipping;
the provisional vehicle speed calculating portion calculates the provisional vehicle speed, wherein the provisional vehicle speed represents a speed at which the vehicle would travel if the antilock brake system were not operating; and
the display-image switching portion executes the display-image switching control based on the provisional vehicle speed if the antilock brake system is operating.

11. The display-image switching apparatus according to claim 9, wherein the slip determining portion determines that any wheel of the vehicle is slipping, if a wheel speed of the vehicle is higher than a predetermined speed due to slipping of a wheel of the vehicle when the vehicle starts moving from a stop.

* * * * *